(12) United States Patent
Sadowski

(10) Patent No.: US 11,869,740 B2
(45) Date of Patent: Jan. 9, 2024

(54) ELECTRICAL SYSTEM WITH DOOR MOUNTED ROTARY HANDLE AND INTERLOCK MECHANISM

(71) Applicant: ABB Schweiz AG, Baden (CH)

(72) Inventor: Mateusz A. Sadowski, Pierzchnica (PL)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/935,866

(22) Filed: Jul. 22, 2020

(65) Prior Publication Data
US 2022/0028630 A1   Jan. 27, 2022

(51) Int. Cl.
H01H 9/22 (2006.01)
H02G 5/08 (2006.01)
H01H 3/10 (2006.01)
H01H 9/28 (2006.01)

(52) U.S. Cl.
CPC .............. *H01H 9/22* (2013.01); *H01H 3/10* (2013.01); *H01H 9/282* (2013.01); *H02G 5/08* (2013.01)

(58) Field of Classification Search
None
See application file for complete search history.

(56) References Cited

U.S. PATENT DOCUMENTS

| 2,263,760 | A | * | 11/1941 | Currie | H01H 9/22 200/50.19 |
| 2,645,688 | A | * | 7/1953 | De Smidt | H01H 9/22 200/50.19 |
| 2,888,529 | A | | 5/1959 | Platz | |
| 2,984,769 | A | | 5/1961 | Turton | |
| 2,984,789 | A | | 5/1961 | O'Brien | |
| 3,007,016 | A | | 10/1961 | Cutler | |
| 3,048,672 | A | | 8/1962 | Cataldo et al. | |
| 3,299,232 | A | | 1/1967 | Geppert | |
| 3,299,233 | A | * | 1/1967 | Sciba | H01R 13/707 200/50.2 |
| 3,312,872 | A | | 4/1967 | Davis | |
| 3,657,606 | A | | 4/1972 | Greger et al. | |

(Continued)

FOREIGN PATENT DOCUMENTS

| CA | 649166 | 9/1962 |
| CA | 819217 | 7/1968 |

(Continued)

OTHER PUBLICATIONS

European Patent Office, International Search Report in International Patent Application No. PCT/IB2021/056599, 5 pp. (dated Nov. 11. 2021).

(Continued)

*Primary Examiner* — Felix O Figueroa
(74) *Attorney, Agent, or Firm* — Leydig, Voit & Mayer, Ltd.

(57) ABSTRACT

An electrical system includes an enclosure for housing an electrical device that is capable of being turned on and off. The enclosure includes a door with an operating handle that, when the door is closed, can be used to turn the electrical device on or off. The operating handle is further operable to displace an interlock mechanism for engagement or disengagement to a busway structure and indicate a status of the electrical device as on, off, or tripped.

13 Claims, 3 Drawing Sheets

(56) References Cited

U.S. PATENT DOCUMENTS

| | | | |
|---|---|---|---|
| 4,000,478 A * | 12/1976 | Jencks | H01H 71/126 |
| | | | 335/34 |
| 4,766,270 A * | 8/1988 | Tringali | H01H 9/26 |
| | | | 200/50.1 |
| 4,912,599 A | 3/1990 | Wittmer | |
| 4,957,447 A | 9/1990 | Hibbert et al. | |
| 5,019,676 A * | 5/1991 | Heckenkamp | H01H 9/22 |
| | | | 200/50.18 |
| 6,023,030 A | 2/2000 | Latimer et al. | |
| 7,311,538 B2 | 12/2007 | West | |
| 7,368,675 B2 | 5/2008 | Ishido et al. | |
| 7,420,132 B2 * | 9/2008 | Jur | H02G 5/08 |
| | | | 174/541 |
| 8,847,088 B2 | 9/2014 | Bhathija et al. | |
| 9,425,588 B2 | 8/2016 | Fischer et al. | |
| 9,679,733 B2 | 6/2017 | Dunker | |
| 9,972,980 B1 * | 5/2018 | Pettersen | H01R 13/70 |
| 10,403,454 B2 | 9/2019 | Singh et al. | |
| 2009/0107819 A1 | 4/2009 | Samudrikam et al. | |
| 2016/0099117 A1 | 4/2016 | Dunker | |

FOREIGN PATENT DOCUMENTS

| | | |
|---|---|---|
| CA | 787522 | 11/1968 |
| CN | 2153885 | 1/1994 |
| CN | 1093329 C | 5/2000 |
| CN | 103579977 A | 2/2014 |
| CN | 108767791 | 6/2018 |
| CN | 107623296 | 1/2019 |
| JP | 2005149918 | 6/2005 |

OTHER PUBLICATIONS

European Patent Office, Written Opinion in International Patent Application No. PCT/IB2021/056599, 12 pp. (dated Nov. 11, 2021).

* cited by examiner

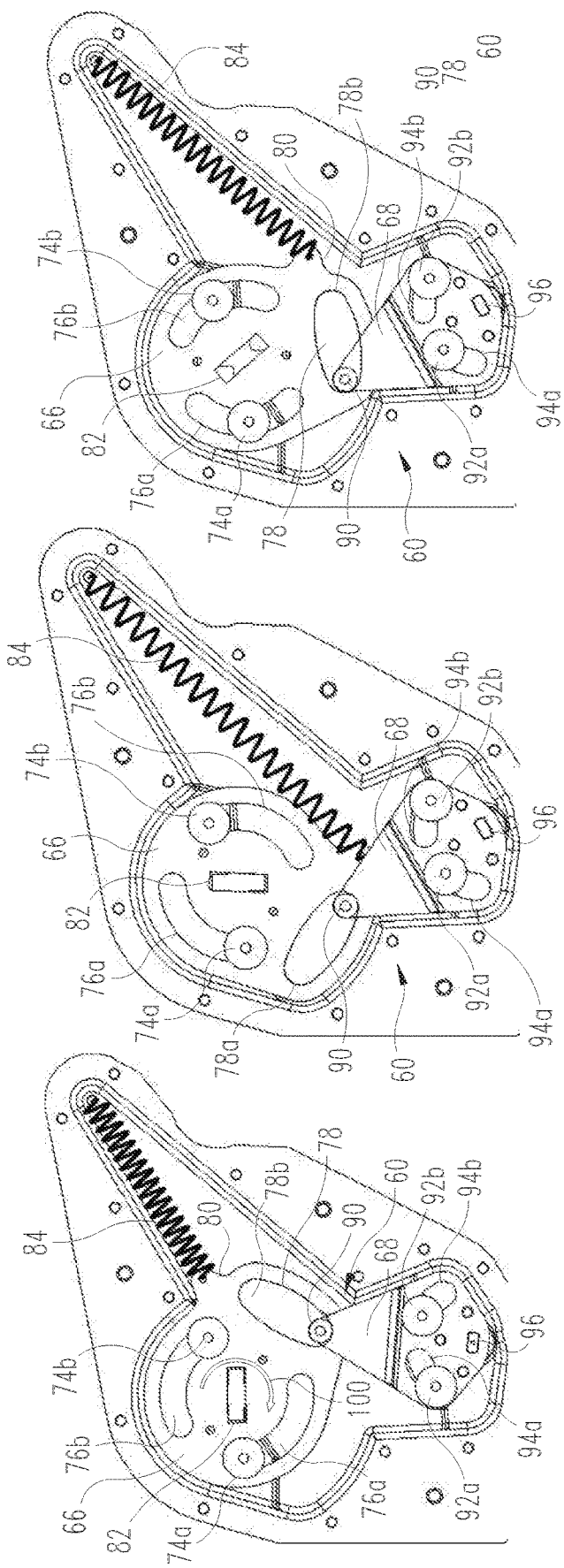

ELECTRICAL SYSTEM WITH DOOR MOUNTED ROTARY HANDLE AND INTERLOCK MECHANISM

TECHNICAL FIELD

The present application generally relates to electrical systems, such as busway systems with tap-off devices, and more particularly, but not exclusively, to electrical systems including an enclosure for an electrical device with a door mounted rotary handle that operates the electrical device in conjunction with an interlock mechanism.

BACKGROUND

Electrical systems and operating safety remain an area of interest. Some existing systems have various shortcomings, drawbacks and disadvantages relative to certain applications. For example, in some busway systems, tap-off devices are provided with handles on a wall of the enclosure that are toggled with movement from an ON position to an OFF position, or from an OFF position to an ON position, to change a status of the electrical device. Other systems employ interlock devices in which a handle is provided to move a connected interlock device that prevents removal of the device from a busway structure. However, these systems require many moving parts and internal components, do not provide for door operation in conjunction with interlock securement, and do not provide signalization of the electrical device status. Accordingly, there remains a need for further contributions in this area of technology.

SUMMARY

One embodiment of the present application is a unique electrical system with an electrical device in an enclosure and an interlock mechanism. Another embodiment is a unique handle system for providing access to and/or signalizing the status of the electrical device within the enclosure, and also for operating an interlock mechanism. Other embodiments include apparatuses, systems, devices, hardware, methods, and combinations for electrical systems, operating handles, status signalization, and related components. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein:

FIG. 5 is an elevation view showing a part of the handle system with the electrical device in an OFF position and the interlock mechanism disengaged.

FIG. 6 is the elevation view of FIG. 5 showing the handle system with the electrical device in an ON position and the interlock mechanism engaged.

FIG. 7 is the elevation view of FIG. 5 showing the handle system signaling the electrical device has been tripped to an OFF position and the interlock mechanism engaged.

DETAILED DESCRIPTION OF THE ILLUSTRATIVE EMBODIMENTS

Figure 1:
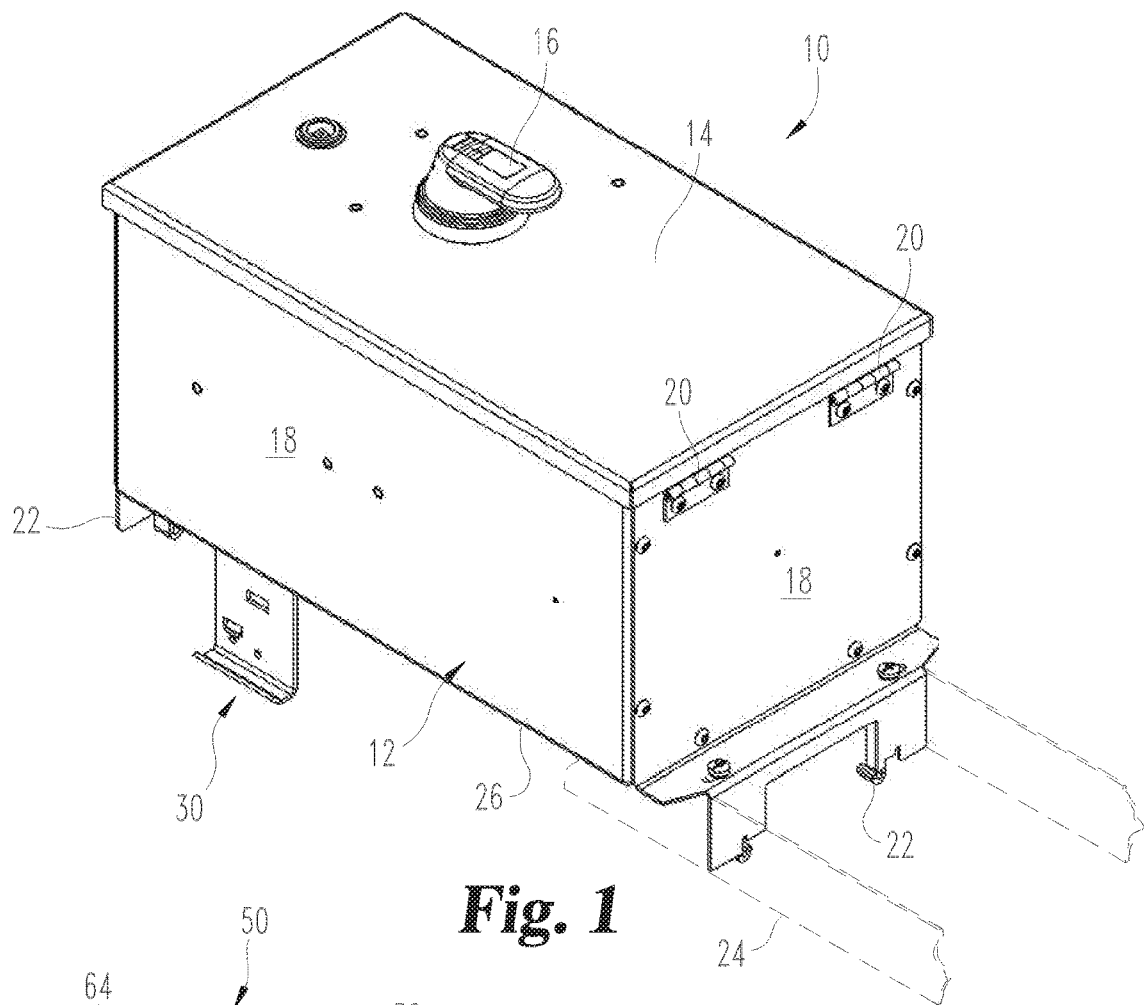
FIG. 1 illustrates a perspective view of a non-limiting example of an electrical system in accordance with an embodiment of the present application.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of an electrical system 10 in accordance with an embodiment of the present disclosure are schematically depicted in a perspective view of a cabinet or enclosure 12. Electrical system 10 includes a cabinet or enclosure 12 having a door 14 with an operating handle 16 mounted to an external side of door 14. Operating handle 16 includes an L-shape to be readily grasped by an operator for rotation, but any suitable shape or configuration is contemplated. Door 14 is pivotally mounted to one of a plurality of sidewalls 18 of enclosure 12 with, for example, one or more hinges 20. Door 14 may also be a removable access panel in other embodiments. The plurality of sidewalls 18 are connected to a rear wall 26.

In the illustrated embodiment, enclosure 12 is rectangular, but any suitable shape and/or configuration for enclosure 12 is contemplated. Enclosure 12 may be any electrical device enclosure. Door 14 provides access to the interior of enclosure 12, e.g., to permit access to an electrical device 28 (FIG. 2), electrical connections thereto, and any other electrical or other components housed within enclosure 12. As used herein, the term "electrical device" should construed broadly to include any suitable electrical switching device, including circuit breakers, busway plug breakers/switches, and/or busway tap-off devices that are capable of being toggled on and off. Enclosure 12 may also include side brackets 22 extending from a rear wall 26 that is opposite of door 14. Side brackets 22 may be provide for mounting enclosure 12 to, for example, a busway structure 24, shown schematically in FIG. 1. Busway structure 24 may be any suitable structure associated with an electrical busway system.

Figure 2:
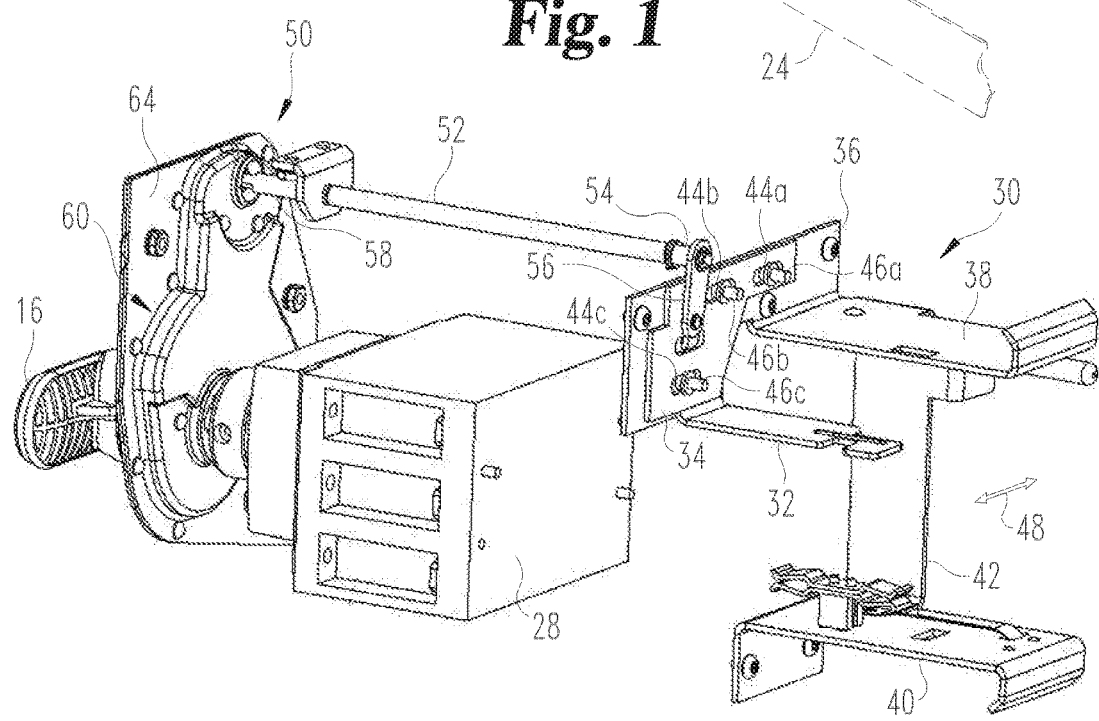
FIG. 2 is a perspective view of a handle system and interlock mechanism illustrating some aspects of a non-limiting example of the electrical system of FIG. 1 in accordance with an embodiment of the present application.

Referring to FIG. 2, operating handle 16 is shown with an actuating system 50 and an interlock mechanism 30. Interlock mechanism 30 is operable to removably couple the electrical system 10 to, for example, the busway structure 24. Interlock mechanism 30 includes an interlock device 32 extending outwardly from a slide plate 34. Interlock device 32 and slide part 34 may be provided as a single integrated members, or separate from one another. Slide plate 34 is movably mounted to a mounting plate 36 that is engageable to rear wall 26 of enclosure 12. Interlock mechanism 30 further includes first and second U-shaped mounting arms 38, 40 connected by a cross member 42 that are also engageable to rear wall 26. Mounting arms 38, 40 may be provided for mounting enclosure 12 to busway structure 24.

Slide plate 34 includes first, second, and third slots 44a, 44b, 44c that receive respective ones of first, second, and third studs 46a, 46b, 46c extending from mounting plate 36 through slide plate 34. As discussed further below, the studs 46a, 46b, 46c retain the slide plate 34 on mounting plate 36 while allowing interlock device 32 to be displaced linearly back and forth as indicated by arrow 48 to interlock the electrical system 10 with the busway structure 24 when electrical device 28 is switched on by operating handle 16, as discussed further below.

In order to displace interlock device 32, slide plate 34 is couple to actuating system 50 with a first shaft 52. First shaft 52 includes a linking arm 56 fixedly coupled at one end to first end 54 of first shaft 52 and pivotally coupled to slide plate 34 at the other end. The second end 58 of first shaft 52 is connected to a cam assembly 60 of actuating assembly 50, which is operable via operating handle 16 to rotate first shaft 52 and operate pivot arm 56 and displace interlock device 32 as indicated by arrows 48, depending on the direction of rotation of operating handle 16.

Figure 3:
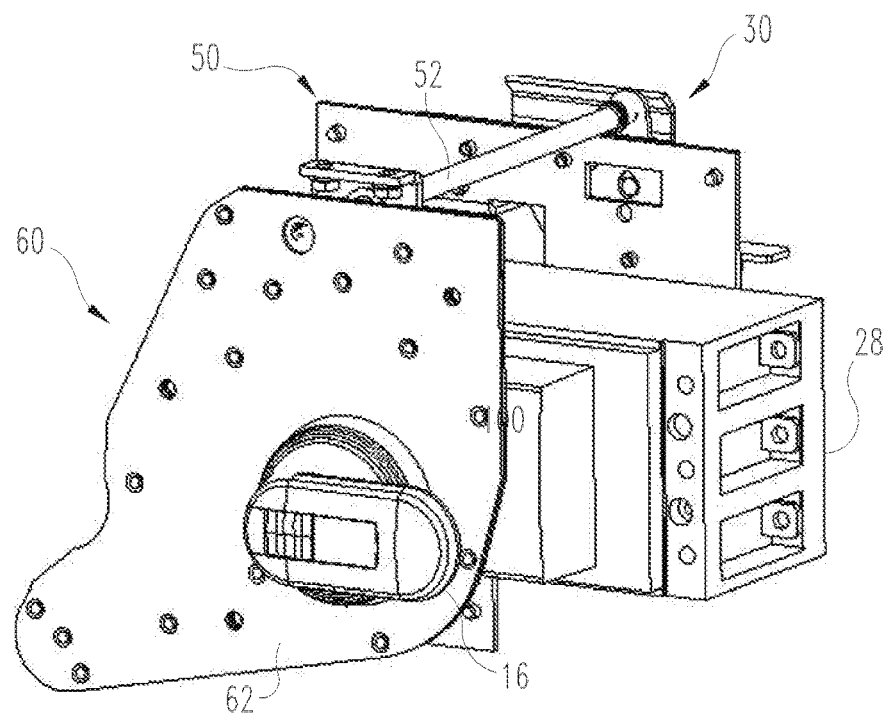
FIG. 3 is another perspective view illustrating some aspects of a non-limiting example of the handle system and interlock mechanism of FIG. 2.
Figure 4:
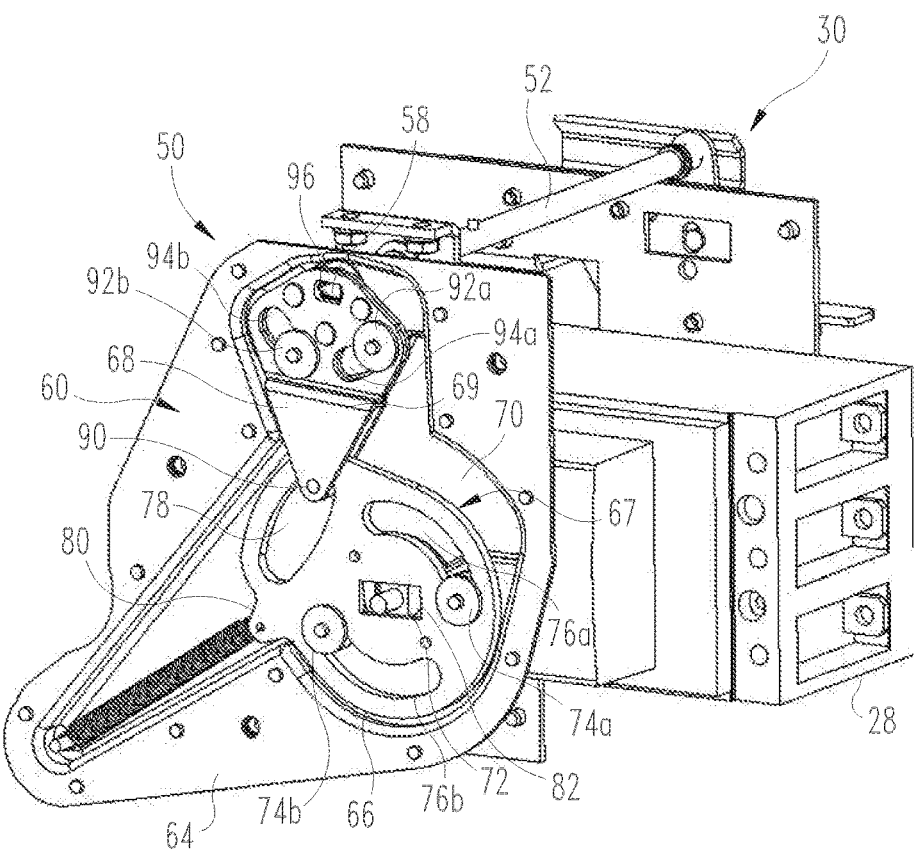
FIG. 4 is the perspective view of FIG. 3 with the rotary handle removed.

Referring to FIGS. 3-4, cam assembly 60 includes a first plate-like cover 62 (FIG. 3) that is mounted to a second plate-like cover 64. A first cam 66 and a second cam 68 are housed in a cavity 70 defined by and between covers 62, 64. Covers 62, 64 can be mounted on an interior side of door 14. A second shaft 72 extends between and is engaged to electrical device 28 and operating handle 16 through covers 62, 64. Second shaft 72 can be used to turn electrical device 28 off and on by rotating operating handle 16 between an OFF position (FIG. 5) and an ON position (FIG. 6.) Second shaft 72 is keyed to first cam 66 in central hole 82 so that first cam 66 rotates with rotation of second shaft 72 via operation of operating handle 16 and/or in response to electrical device 28 tripping. Second shaft 72 can extend from electrical device 28 for engagement by operating 16 and cam assembly 60 when the door is closed and disengagement when door 14 is open. Alternatively, second shaft 72 may move with door 14 and engage electrical device 28 when door 14 is closed and disengaged electrical device 28 when door 14 is open.

First cam 66 includes a generally circularly shaped body 67 defining a first arcuate slot 76a and a second arcuate slot 76b about central hole 82. First and second pins 74a, 74b extend through respective ones of the slots 76a, 76b and rotatably secure body 66 to cover 64. Body 67 also includes an arced groove 78 about a center of body 67 that is coupled to second cam 68. An ear 80 extends outwardly from body 67 for engagement to a biasing member 84. In the illustrated embodiment, biasing member 84 is a coil spring engaged at one end to ear 80 and at an opposite end to second cover 64. Other embodiments contemplate other types of biasing members and the present disclosure is not limited to a coil spring.

Second cam 68 includes a generally triangularly shaped body 69 that is rotatable relative to second cover 64. Body 69 includes a coupling member 90 at an apex thereof that is received in an arced groove 78 of first cam 66. Body 69 also includes third and fourth arcuate slots 94a, 94b that extend partially around a receptacle 96, and receptacle 96 is located on body 69 opposite of coupling member 90. Third and fourth pins 92a, 92b extend through respective ones of the slots 94a, 94b to further secure second cam 68 to cover 64 while allowing second cam 68 to rotate about receptacle 96 in response to rotation of first cam 66. Since second end 58 of first shaft 52 is captured in receptacle 96, first shaft 52 also rotates in response to rotation of second cam 68 to displace interlock device 32 as shown by arrows 48, as discussed above.

Referring further to FIGS. 5-7, operation of electrical device 28 when disposed in enclosure 12 is illustrated. Second shaft 72 is operative to rotate via rotation of operating handle 16 to turn electrical device 28 on and off. In one form, a clockwise rotation 100 from an OFF position as shown in FIG. 5 to an ON position as shown in FIG. 6 is operative to turn electrical device 28 from off to on, whereas a counterclockwise rotation is operative to turn electrical device 28 off. Door 14 and/or operating handle 16 may include an indicator to indicate whether the electrical device 28 is on or off depending on the position of operating handle 16. In other embodiments, the rotation directions for turning electrical device 28 on and off may be reversed.

In the ON position, biasing member 84 is tensioned to bias operating handle 16 toward the OFF position of FIG. 5, but operating handle 16 is maintained in the ON position due to the force required to switch electrical device 28 off is greater than the biasing force of biasing member 84. When door 14 is open, operating handle 16 is disconnected from shaft 72 and/or electrical device 28, and cam assembly 60 is disconnected from actuating assembly 50.

During normal operation, door 14 is closed, and external operating handle 16 is coupled to second shaft 72 through door 14, and is operative to rotate shaft 72 to turn electrical device 28 on and off as discussed above. Simultaneously, second cam 68 of cam assembly 60 is coupled to actuating assembly 50 for displacement of interlock device 32. In particular, second end 58 of first shaft 52 is engaged to second cam 68 in receptacle 96 when door 14 is closed. Therefore, rotation of operating handle 16 to turn electrical device 28 on and off also rotates first cam 66, which rotates second cam 68, which in turn rotates first shaft 52 to displace interlock device 32 and engage interlock device 32 to busway structure 24 when electrical device 28 is on and disengage interlock device 32 from the busway structure 24 when the electrical device 28 is off.

In response to electrical device 28 being tripped, biasing member 84 is able to overcome frictional forces and partially rotate operating handle 16 to a location between the ON position and the OFF position, as shown in FIG. 7. This provides an indication or visual signalization that electrical device 28 has tripped while interlock device 32 remains engaged to busway structure 24.

In one embodiment, the slots 76a, 76b of first cam 66 are configured to allow first cam 66 to rotate between 75 degrees and 105 degrees between the on and off positions of electrical device 28, while the slots 94a, 94b are configured to allow second cam 68 to rotate between 30 degrees and 60 degrees to rotate first shaft 52 to displace interlock device 32 between the engaged and disengaged positions. In one embodiment, slots 76a, 76b are configured to allow ninety 90 degrees of rotation of first cam 66 between the on and off positions of electrical device 28, while slots 94a, 94b are configured to allow 45 degrees of rotation of second cam 68 to engage and disengage interlock device 32. In other embodiments, the amount of rotation of the first and second cams 66, 68 can be any amount that allows engagement and disengagement of the interlock device 32 from the busway structure.

During rotation of operating handle 16 from the OFF position to the ON position, coupling member 90 moves in the clockwise direction 100 from a first end 78a of groove 78 as shown in FIG. 5 to the opposite second end 78b of groove 78 in response to rotation of first cam 66 via operating handle 16, and then first cam 66 continues to rotate to rotate second cam 68 via operating handle 16 until the ON position is reached as shown in FIG. 6. In response to tripping of electrical device 28, first cam 66 rotates in the opposite direction, in response to the force of biasing member 84, so that coupling member 90 moves from second end 78b of groove 78 to the opposite first end 78a of groove 78, while second cam 68 remains stationary, as shown in FIG. 7. As a result, operating handle 16 is rotated to a position between the ON position and the OFF position, providing an indication the electrical device 28 has tripped while interlock device 32 remains engaged to busway structure 24.

In one embodiment, slots 76a, 76b are configured to allow between 30 and 60 degrees of rotation of first cam 66 and operating handle 16 to provide the electrical device tripping signalization. In one embodiment, slots 76a, 76b are configured to allow 45 degrees of rotation of first cam 66 and operating handle 16 to indicate tripping of electrical device 28.

Various aspects of the present disclosure are contemplated. According to one aspect, an electrical apparatus includes an enclosure having a door movable for access to an interior of the enclosure and an electrical device disposed in the interior of the enclosure. The electrical device is operable to be turned on or off. An operating handle is provided on the door outside the enclosure that is operable to open and close the door. With the door closed, the operating handle is engaged to the electrical device and with the door open the operating handle is disengaged from the electrical device. A cam assembly on the door rotates with rotation of the operating handle. The apparatus also includes an interlock mechanism with an interlock device. The interlock mechanism is connected to the cam assembly. With the door closed, rotation of the operating handle turns the electrical device on or off and rotates the cam assembly which displaces the interlock device for engagement or disengagement with a busway structure.

In one embodiment, the cam assembly includes a first cam on the door that rotates with rotation of the operating handle between an on position and an off position. A second cam on the door is linked to the first cam, and the second cam rotates between an engaged position and a disengaged position in response to the operating handle being rotated to turn the electrical device on or off.

In one refinement, in response to tripping of the electrical device, the first cam rotates with the operating handle from the on position toward the off position and the second cam remains stationary at the engaged position so the interlock device remains engaged to the busway structure. In a further refinement, the first cam rotates between 75 degrees and 105 degrees between the on and off positions while the second cam rotates between 30 degrees and 60 degrees between the engaged and disengaged positions. In yet a further refinement, in response to tripping of the electrical device, the first cam rotates between 30 degrees and 60 degrees from the on position toward the off position.

In another refinement, the first cam is biased toward the off position. The bias facilitating rotation of the first cam and the operating handle toward the off position in response to tripping of the electrical device.

In one embodiment, the apparatus includes a shaft that removably engages the operating handle to the electrical device with the door closed. In a refinement of this embodiment, the shaft rotates the cam assembly with rotation of the operating handle.

In one embodiment, the apparatus includes a shaft having a first end connected to the cam assembly and a second end connected to an interlock cam. The interlock mechanism includes a slide plate connecting the interlock cam to the interlock device. Rotation of the shaft translates the slide plate to displace the interlock device for engagement or disengagement with the busway structure. In another embodiment, the operating handle is L-shaped.

According to another aspect, a system to operate an electrical device in an enclosure is provided. The system includes an operating handle mountable on a door of the enclosure, and a shaft for engaging the operating handle to the electrical device in the enclosure with the door closed and for disengaging the operating handle from the electrical device with the door open. Rotation of the operating handle with the door closed turns the electrical device on or off. A cam assembly is engaged to and rotatable by the shaft via the operating handle. An interlock mechanism includes an interlock device. The interlock mechanism is removably engaged to the cam assembly with the door closed for rotation via the cam assembly upon rotation of the operating handle to displace the interlock device for engagement or disengagement with a busway structure.

In one embodiment, the cam assembly includes a first cam on the door that rotates with rotation of the operating handle between an on position and an off position, and a second cam on the door that is linked to the first cam. The second cam rotates between an engaged position and a disengaged position in response to the operating handle being rotated to turn the electrical device on or off. In one refinement of this embodiment, in response to tripping of the electrical device, the first cam rotates with the operating handle from the on position toward the off position and the second cam remains stationary at the engaged position.

In a further refinement, the first cam rotates between 75 degrees and 105 degrees between the on and off positions while the second cam rotates between 30 degrees and 60 degrees between the engaged and disengaged positions. In yet a further refinement, in response to tripping of the electrical device, the first cam rotates between 30 degrees and 60 degrees from the on position toward the off position. In a further refinement, the first cam is spring biased toward the off position, the spring bias facilitating automatic rotation of the first cam toward the off position in response to tripping of the electrical device.

In another embodiment, the interlock mechanism includes a slide plate connected to the cam assembly. Rotation of the cam assembly translates the slide plate to displace the interlock device for engagement or disengagement with the busway structure.

In another aspect of the present disclosure, an electrical system includes an enclosure having a door for access to an interior of the enclosure and an electrical device in the interior of enclosure and a shaft extending therefrom. The electrical device is configured to be operated by a rotation of the shaft. An operating handle is disposed outside the enclosure and coupled to the electrical device with the door closed, and the operating handle is operative to rotate the shaft to turn the electrical device on or off. The system also includes an interlock mechanism for selectively engaging the enclosure to a busway structure, and a cam assembly on the door that is connected to the interlock mechanism. The cam assembly is operable upon rotation of the operating handle to displace the interlock mechanism to engage or disengage the busway structure.

In one embodiment, the cam assembly includes a first cam pivotally linked to a second cam, and the operating handle is engaged to the first cam and the interlock mechanism is engaged to the second cam. In one refinement of this embodiment, the first cam is spring biased to rotate the handle in response to a tripping of the electrical device.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An electrical system, comprising:
   an enclosure having a door movable for access to an interior of the enclosure;
   an electrical device disposed in the interior of the enclosure, the electrical device being operable to be turned on or off, wherein the electrical device is selectively coupled to a busway structure;
   an operating handle on the door outside the enclosure that is operable to open and close the door, wherein with the door closed the operating handle is engaged to the electrical device and with the door open the operating handle is disengaged from the electrical device and wherein with the door closed rotation of the operating handle turns the electrical device on or off;
   a cam assembly on the door that rotates with rotation of the operating handle;
   an interlock mechanism including an interlock device movable between an engaged position and a disengaged position relative to the busway structure wherein in the engaged position the interlock device couples the busway structure to the electrical device and in the disengaged position the interlock device uncouples the busway structure from the electrical device, wherein the interlock mechanism is connected to the cam assembly, wherein with the door closed rotation of the operating handle rotates the cam assembly which displaces the interlock device to the engaged position or the disengaged position;
   wherein the cam assembly includes:
      a first cam on the door that rotates with rotation of the operating handle between an on position and an off position; and
      a second cam on the door that is linked to the first cam, wherein the second cam rotates to effect movement of the interlock device between the engaged position and the disengaged position in response to the operating handle being rotated to turn the electrical device on or off; and
   wherein, in response to tripping of the electrical device, the first cam rotates with the operating handle from the on position to an intermediate position toward the off position, and the second cam remains stationary so the interlock device remains in the engaged position relative to the busway structure and the electrical device remains off; and
   a first shaft having a first end connected to the cam assembly and a second end connected to a pivot arm; and
   wherein the interlock mechanism includes a slide plate connecting the pivot arm to the interlock device, wherein rotation of the shaft causes the pivot arm to translate the slide plate to displace the interlock device for engagement or disengagement with the busway structure.

2. The electrical apparatus of claim 1, wherein the first cam rotates between 75 degrees and 105 degrees between the on and off positions while the second cam rotates between 30 degrees and 60 degrees.

3. The electrical apparatus of claim 2, wherein, in response to tripping of the electrical device, the first cam rotates between 30 degrees and 60 degrees from the on position toward the off position.

4. The electrical apparatus of claim 1, wherein the first cam is biased toward the off position, the bias facilitating rotation of the first cam and the operating handle toward the off position in response to tripping of the electrical device.

5. The electrical apparatus of claim 1, further comprising a second shaft that removably engages the operating handle to the electrical device with the door closed.

6. The electrical apparatus of claim 5, wherein the shaft rotates the cam assembly with rotation of the operating handle.

7. The electrical apparatus of claim 1, wherein the operating handle is L-shaped.

8. A system to operate an electrical device in an enclosure, comprising:
   an operating handle mountable on a door of the enclosure;
   a shaft for engaging the operating handle to the electrical device in the enclosure with the door closed and for disengaging the operating handle from the electrical device with the door open, wherein rotation of the operating handle with the door closed turns the electrical device on or off, wherein the electrical device is coupled to a busway structure;
   a cam assembly engaged to and rotatable by the shaft via the operating handle; and
   an interlock mechanism including an interlock device movable between an engaged position and a disengaged position relative to the busway structure wherein in the engaged position the interlock device couples the busway structure to the electrical device and in the disengaged position the interlock device uncouples the busway structure from the electrical device, the interlock mechanism being removably engaged to the cam assembly with the door closed for rotation via the cam assembly upon rotation of the operating handle to displace the interlock device to the engaged position or the disengaged position;
   wherein the cam assembly includes:
      a first cam on the door that rotates with rotation of the operating handle between an on position and an off position; and
      a second cam on the door that is linked to the first cam, wherein the second cam rotates to effect movement of the interlock device between the engaged position and the disengaged position in response to the operating handle being rotated to turn the electrical device on or off;

wherein, in response to tripping of the electrical device, the first cam rotates with the operating handle from the on position to an intermediate position toward the off position, and the second cam remains stationary so the interlock device remains in the engaged position relative to the busway structure and the electrical device remains off; and a first shaft having a first end connected to the cam assembly and a second end connected to a pivot arm; and wherein the interlock mechanism includes a slide plate connecting the pivot arm to the interlock device, wherein rotation of the shaft causes the pivot arm to translate the slide plate to displace the interlock device for engagement or disengagement with the busway structure.

9. The system of claim 8, wherein the first cam rotates between 75 degrees and 105 degrees between the on and off positions while the second cam rotates between 30 degrees and 60 degrees.

10. The system of claim 9, wherein, in response to tripping of the electrical device, the first cam rotates between 30 degrees and 60 degrees from the on position toward the off position.

11. The system of claim 8, wherein the first cam is spring biased toward the off position, the spring bias facilitating automatic rotation of the first cam toward the off position in response to tripping of the electrical device.

12. An electrical system, comprising:

an enclosure having a door for access to an interior of the enclosure;

an electrical device in the interior of enclosure and a shaft extending therefrom, wherein the electrical device is configured to be operated by a rotation of the shaft, wherein the electric device is coupled to a busway structure;

an operating handle disposed outside the enclosure and coupled to the electrical device with the door closed, wherein the operating handle is operative to rotate the shaft to turn the electrical device on or off;

an interlock mechanism including an interlock device movable between an engaged position and a disengaged position relative to the busway structure wherein in the engaged position the interlock device couples the busway structure to the electrical device and in the disengaged position the interlock device uncouples the busway structure from the electrical device; and a cam assembly on the door that is connected to the interlock mechanism, wherein the cam assembly is operable upon rotation of the operating handle to displace the interlock device between the engaged position or the disengaged position relative to the busway structure, wherein the cam assembly includes a first cam on the door that rotates with rotation of the operating handle between an on position and an off position; and a second cam on the door that is linked to the first cam, wherein the second cam rotates to effect movement of the interlock device between the engaged position and the disengaged position in response to the operating handle being rotated to turn the electrical device on or off; and wherein, in response to tripping of the electrical device, the first cam rotates with the operating handle from the on position to an intermediate position toward the off position, and the second cam remains stationary so the interlock device remains in the engaged position relative to the busway structure and the electrical device remains off; and a first shaft having a first end connected to the cam assembly and a second end connected to a pivot arm; and wherein the interlock mechanism includes a slide plate connecting the pivot arm to the interlock device, wherein rotation of the shaft causes the pivot arm to translate the slide plate to displace the interlock device for engagement or disengagement with the busway structure.

13. The electrical system of claim 12, wherein the first cam is pivotally linked to the second cam, and wherein the operating handle is engaged to the first cam and the interlock mechanism is engaged to the second cam.

\* \* \* \* \*